United States Patent
Tellis et al.

(10) Patent No.: US 9,772,923 B2
(45) Date of Patent: Sep. 26, 2017

(54) FAST OLAP FOR REAL USER MEASUREMENT OF WEBSITE PERFORMANCE

(71) Applicant: SOASTA, Inc., Mountain View, CA (US)

(72) Inventors: Philip Santosh Tellis, Cambridge, MA (US); Vernon Archie Brewer, III, Menlo Park, CA (US)

(73) Assignee: SOASTA, Inc., Mountain View, CA (US)

( * ) Notice: Subject to any disclaimer, the term of this patent is extended or adjusted under 35 U.S.C. 154(b) by 269 days.

(21) Appl. No.: 13/830,946

(22) Filed: Mar. 14, 2013

(65) Prior Publication Data

US 2014/0280880 A1 Sep. 18, 2014

(51) Int. Cl.
| | |
|---|---|
| *G06F 15/16* | (2006.01) |
| *G06F 11/34* | (2006.01) |
| *H04L 12/24* | (2006.01) |
| *G06F 11/30* | (2006.01) |
| *G06F 11/32* | (2006.01) |

(52) U.S. Cl.
CPC ...... *G06F 11/3419* (2013.01); *G06F 11/3082* (2013.01); *G06F 11/3452* (2013.01); *H04L 41/5009* (2013.01); *H04L 41/5083* (2013.01); *G06F 11/32* (2013.01); *G06F 11/3438* (2013.01); *G06F 11/3495* (2013.01); *G06F 2201/875* (2013.01); *G06F 2201/88* (2013.01)

(58) Field of Classification Search
CPC ............. G06F 17/3089; G06F 11/3409; G06F 11/3419; G06F 11/3082; G06F 11/3452; G06F 11/32; H04L 43/06; H04L 41/5009; H04L 41/5083
USPC .......................................................... 709/224
See application file for complete search history.

(56) References Cited

U.S. PATENT DOCUMENTS

| | | |
|---|---|---|
| 5,414,809 A | 5/1995 | Hogan et al. |
| 5,615,347 A | 3/1997 | Davis et al. |
| 5,724,525 A | 3/1998 | Beyers et al. |
| 5,945,986 A | 8/1999 | Bargar et al. |
| 6,025,853 A | 2/2000 | Baldwin |

(Continued)

OTHER PUBLICATIONS

Chester et al., Mastering Excel 97, 1994, Sybex, 4th Ed., pp. 1016, 136-137, 430, 911, 957-958.

(Continued)

*Primary Examiner* — Glenton B Burgess
*Assistant Examiner* — Tan Doan
(74) *Attorney, Agent, or Firm* — The Law Offices of Bradley J. Bereznak

(57) ABSTRACT

A method for real-time capture and analysis of website performance metrics includes receiving, in each of a plurality of result servers, data values transmitted from a plurality of client devices, each data value representing a measurement of a performance metric associated with an experience of a user on a web page or using a web application, the measurement being made and the data value produced being transmitted in real-time while the user is on the web page or using the web application. For each data value received, a count in one of a set of N data buckets defined in a memory is incremented. All of the counts in each of the corresponding data buckets is aggregated to produce a histogram of the performance metric is rendered on an analytic dashboard.

15 Claims, 5 Drawing Sheets

(56) References Cited

U.S. PATENT DOCUMENTS

| | | | |
|---|---|---|---|
| 6,092,043 A | 7/2000 | Squires et al. | |
| 6,134,582 A | 10/2000 | Kennedy | |
| 6,317,786 B1 | 11/2001 | Yamane et al. | |
| 6,434,513 B1 | 8/2002 | Sherman et al. | |
| 6,477,483 B1 | 11/2002 | Scarlat et al. | |
| 6,542,163 B2 | 4/2003 | Gorbet et al. | |
| 6,560,564 B2 | 5/2003 | Scarlat et al. | |
| 6,563,523 B1 | 5/2003 | Suchocki et al. | |
| 6,601,020 B1 | 7/2003 | Myers | |
| 6,738,933 B2 | 5/2004 | Fraenkel et al. | |
| 6,792,393 B1 | 9/2004 | Farel et al. | |
| 6,817,010 B2 | 11/2004 | Aizenbud-Reshef et al. | |
| 6,898,556 B2 | 5/2005 | Smocha et al. | |
| 6,959,013 B1 | 10/2005 | Muller et al. | |
| 6,975,963 B2 | 12/2005 | Hamilton et al. | |
| 7,050,056 B2 | 5/2006 | Meyringer | |
| 7,133,805 B1 | 11/2006 | Dankenbring et al. | |
| 7,216,168 B2 | 5/2007 | Merriam | |
| 7,334,162 B1 | 2/2008 | Vakrat et al. | |
| 7,376,902 B2 | 5/2008 | Lueckhoff | |
| 7,464,121 B2 | 12/2008 | Barcia et al. | |
| 7,478,035 B1 | 1/2009 | Wrench et al. | |
| 7,548,875 B2 | 6/2009 | Mikkelsen et al. | |
| 7,587,638 B2 | 9/2009 | Shah et al. | |
| 7,594,238 B2 | 9/2009 | Takahashi | |
| 7,607,169 B1 | 10/2009 | Njemanze | |
| 7,617,201 B1 | 11/2009 | Bedell et al. | |
| 7,630,862 B2 | 12/2009 | Glas et al. | |
| 7,685,234 B2 | 3/2010 | Gottfried | |
| 7,689,455 B2 | 3/2010 | Fligler et al. | |
| 7,693,947 B2 | 4/2010 | Judge et al. | |
| 7,725,812 B1 | 5/2010 | Balkus et al. | |
| 7,743,128 B2 | 6/2010 | Mullarkey | |
| 7,757,175 B2 | 7/2010 | Miller | |
| 7,844,036 B2 | 11/2010 | Gardner et al. | |
| 7,965,643 B1 * | 6/2011 | Gilbert et al. | 370/241 |
| 8,015,327 B1 | 9/2011 | Zahavi et al. | |
| 8,166,458 B2 | 4/2012 | Li et al. | |
| 8,291,079 B1 | 10/2012 | Colton et al. | |
| 8,306,195 B2 | 11/2012 | Gardner et al. | |
| 8,341,462 B2 | 12/2012 | Broda et al. | |
| 8,448,148 B1 | 5/2013 | Kolawa et al. | |
| 8,464,224 B2 | 6/2013 | Dulip et al. | |
| 8,479,122 B2 | 7/2013 | Hotelling et al. | |
| 8,510,600 B2 | 8/2013 | Gardner et al. | |
| 8,583,777 B1 | 11/2013 | Boyle et al. | |
| 9,015,654 B2 | 4/2015 | Kaasila et al. | |
| 9,021,362 B2 | 4/2015 | Broda et al. | |
| 9,154,611 B1 | 10/2015 | Jackson et al. | |
| 9,229,842 B2 | 1/2016 | Broda et al. | |
| 9,251,035 B1 | 2/2016 | Vazac et al. | |
| 9,384,121 B2 | 7/2016 | Jackson et al. | |
| 9,436,579 B2 | 9/2016 | Broda et al. | |
| 2002/0138226 A1 | 9/2002 | Doane | |
| 2002/0147937 A1 | 10/2002 | Wolf | |
| 2003/0074161 A1 | 4/2003 | Smocha et al. | |
| 2003/0074606 A1 | 4/2003 | Boker | |
| 2003/0109951 A1 | 6/2003 | Hsiung et al. | |
| 2003/0130982 A1 | 7/2003 | Kasriel et al. | |
| 2003/0195960 A1 | 10/2003 | Merriam | |
| 2004/0010584 A1 | 1/2004 | Peterson et al. | |
| 2004/0039550 A1 | 2/2004 | Myers | |
| 2004/0059544 A1 | 3/2004 | Smocha et al. | |
| 2004/0064293 A1 * | 4/2004 | Hamilton et al. | 702/182 |
| 2004/0119713 A1 | 6/2004 | Meyringer | |
| 2004/0123320 A1 | 6/2004 | Daily et al. | |
| 2004/0205724 A1 | 10/2004 | Mayberry | |
| 2005/0027858 A1 * | 2/2005 | Sloth | H04L 12/2602 709/224 |
| 2005/0102318 A1 | 5/2005 | Odhner et al. | |
| 2005/0182589 A1 | 8/2005 | Smocha et al. | |
| 2005/0216234 A1 | 9/2005 | Glas et al. | |
| 2005/0278458 A1 | 12/2005 | Berger et al. | |
| 2006/0031209 A1 | 2/2006 | Ahlberg et al. | |
| 2006/0075094 A1 | 4/2006 | Wen et al. | |
| 2006/0229931 A1 | 10/2006 | Fligler et al. | |
| 2006/0271700 A1 | 11/2006 | Kawai et al. | |
| 2007/0143306 A1 | 6/2007 | Yang | |
| 2007/0232237 A1 | 10/2007 | Croak et al. | |
| 2007/0282567 A1 | 12/2007 | Dawson et al. | |
| 2007/0283282 A1 | 12/2007 | Bonfiglio et al. | |
| 2007/0288205 A1 * | 12/2007 | Vazquez | G06Q 10/04 702/189 |
| 2008/0049641 A1 | 2/2008 | Edwards et al. | |
| 2008/0059947 A1 | 3/2008 | Anand et al. | |
| 2008/0066009 A1 | 3/2008 | Gardner et al. | |
| 2008/0140347 A1 * | 6/2008 | Ramsey et al. | 702/180 |
| 2008/0147462 A1 | 6/2008 | Muller | |
| 2008/0189408 A1 | 8/2008 | Cancel et al. | |
| 2008/0235075 A1 * | 9/2008 | Couture | G06F 11/3495 709/224 |
| 2009/0077107 A1 | 3/2009 | Scumniotales et al. | |
| 2009/0271152 A1 | 10/2009 | Barrett | |
| 2009/0300423 A1 | 12/2009 | Ferris | |
| 2010/0023867 A1 | 1/2010 | Coldiron et al. | |
| 2010/0057935 A1 | 3/2010 | Kawai et al. | |
| 2010/0115496 A1 | 5/2010 | Amichai | |
| 2010/0198960 A1 | 8/2010 | Kirschnick et al. | |
| 2010/0250732 A1 | 9/2010 | Bucknell | |
| 2010/0251128 A1 | 9/2010 | Cordasco | |
| 2010/0333072 A1 | 12/2010 | Dulip et al. | |
| 2011/0066892 A1 | 3/2011 | Gardner et al. | |
| 2011/0119370 A1 | 5/2011 | Huang et al. | |
| 2011/0130205 A1 | 6/2011 | Cho et al. | |
| 2011/0191465 A1 | 8/2011 | Hofstaedter et al. | |
| 2011/0202517 A1 | 8/2011 | Reddy et al. | |
| 2011/0282642 A1 | 11/2011 | Kruger et al. | |
| 2012/0017165 A1 | 1/2012 | Gardner et al. | |
| 2012/0017210 A1 | 1/2012 | Huggins et al. | |
| 2012/0023429 A1 | 1/2012 | Medhi | |
| 2012/0101799 A1 | 4/2012 | Fernandes | |
| 2012/0166634 A1 * | 6/2012 | Baumback et al. | 709/224 |
| 2012/0246310 A1 | 9/2012 | Broda et al. | |
| 2012/0314616 A1 | 12/2012 | Hong et al. | |
| 2013/0031449 A1 | 1/2013 | Griffiths et al. | |
| 2013/0097307 A1 | 4/2013 | Vazac et al. | |
| 2013/0116976 A1 | 5/2013 | Kanemasa et al. | |
| 2013/0166634 A1 | 6/2013 | Holland | |
| 2014/0033055 A1 | 1/2014 | Gardner et al. | |
| 2014/0189320 A1 * | 7/2014 | Kuo | 712/222 |
| 2015/0067527 A1 | 3/2015 | Gardner et al. | |
| 2015/0319071 A1 | 11/2015 | Kaasila et al. | |

OTHER PUBLICATIONS

Malan et al. "An Extensible Probe Architecture for Network Protocol Performance Measurement", IEEE, Oct. 1998, pp. 215-227.

Jamin et al. "A Measurement-Based Admission Control Algorithm for Integrated Service Packet Networks", IEEE, 1997, pp. 56-70.

Dillenseger, "CLIF, a framework based on Fractal for flexible, distributed load testing" Nov. 18, 2008, Ann. Telecommun., 64:101-120.

* cited by examiner

US 9,772,923 B2

FAST OLAP FOR REAL USER MEASUREMENT OF WEBSITE PERFORMANCE

TECHNICAL FIELD

The present disclosure relates generally to cloud computing and mobile testing; more particularly, to automated systems and methods for capturing and analyzing real-time information of actual user experience on websites and using web-based applications.

BACKGROUND

Various platforms for load testing of websites and web-based applications are commercially available. For example, U.S. Pat. No. 7,844,026 describes a real-time analytics tool that allows businesses to gather and display live performance data obtained from running a complex test composition on a target website or web application. This tool performs a load test utilizing large numbers (e.g., hundreds of thousands) of virtual users, providing business intelligence data results that permit a business to pinpoint performance bottlenecks and potential areas of stress in a web application.

Organizations are also interested in real user measurement (RUM) data analysis that captures and collects data about present, real user experiences when users visit and use a website or web application. For example, businesses engaged in e-commerce are often interested in a performance metric known as the "bounce rate", which is a ratio of the number of visitors to a website who immediately leave the site after viewing only one page, versus users who click on an actionable item or icon (e.g., to place an item in a shopping cart). Since there is a strong correlation between the speed of a website (e.g., the time to load a webpage) and the probability of a user bouncing, real-time analytics that gives businesses and developers insight into RUM across all browsers and locations is very valuable.

Online analytical processing (OLAP) of collected data has recently given rise to the use of analytic dashboards as a way to visualize key performance indicators of a website or web application. Dashboards usually consist of a series of graphics, charts, gauges and other visual indicators that can be monitored and interpreted. Analytical dashboards typically support interactions with the data, such as drilling down into the underlying details. One visual indicator typically found in dashboards is a histogram. A histogram is a type of graph widely used in statistics to visually interpret numerical data by indicating the number of data points that lie within a range of values, commonly referred to as a class or bin. The frequency of the data that falls in each class is depicted by the use of a bar. The height of the bar corresponds to the relative frequency of the amount of data in the class. In other words, the higher the bar, the greater the frequency of the data. Conversely, the lower the bar the lower the frequency of the data. The bars in a histogram are arranged and displayed in the order that the classes occur.

One of the problems with providing visual indicators such as histograms in real-time analytic dashboards is that statistical information, such as a percentile calculation, needs to be performed in real-time, concurrently with the on-going collection of data, which can involve tens or hundreds of millions of real user measurements. For example, a typical way to compute a percentile is to first sort all of the data points in ascending order, i.e., smallest data points to the largest. The nth percentile is then determined by the corresponding location in the order. By way of example, if 100 data points are sorted in ascending order, then the tenth percentile is the tenth data point in the order. But with extremely large data sets the computing power and memory requirements needed to store and sort all of the data can quickly exceed reasonable bounds.

BRIEF DESCRIPTION OF THE DRAWINGS

The present disclosure will be understood more fully from the detailed description that follows and from the accompanying drawings, which however, should not be taken to limit the invention to the specific embodiments shown, but are for explanation and understanding only.

DETAILED DESCRIPTION

Figure 1:
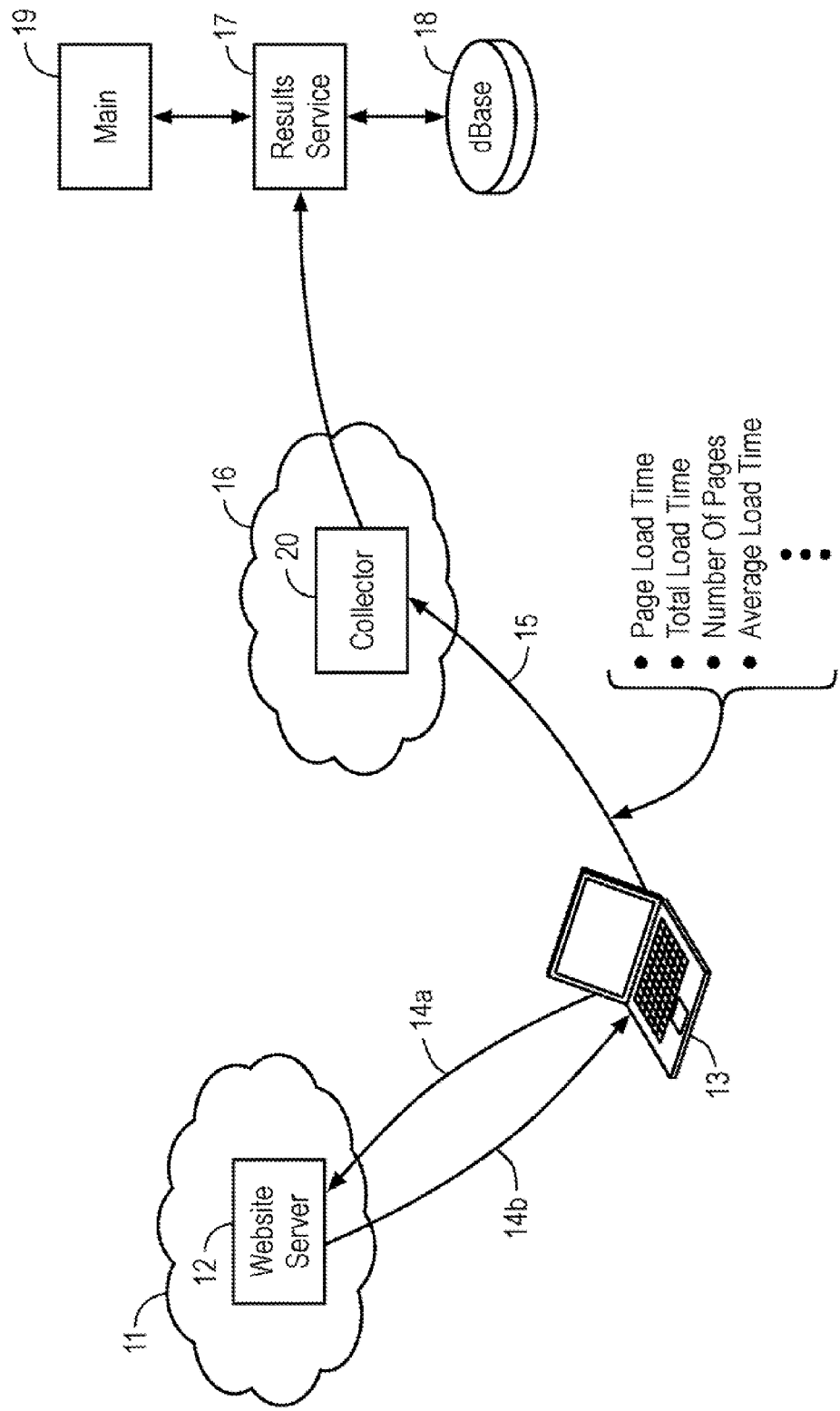
FIG. 1 is an example architectural diagram illustrating a computing platform that captures performance metrics from real user measurements.

In the following description specific details are set forth, such as data types, metrics, devices, functions, etc., in order to provide a thorough understanding of the subject matter disclosed herein. However, persons having ordinary skill in the relevant arts will appreciate that these specific details may not be needed to practice the present invention. It should also be understood that the elements in the figures are representational, and are not necessarily drawn to scale in the interest of clarity.

References throughout this description to "one embodiment", "an embodiment", "one example" or "an example" means that a particular feature, structure or characteristic described in connection with the embodiment or example is included in at least one embodiment. The phrases "in one embodiment", "in an embodiment", "one example" or "an example" in various places throughout this description are not necessarily all referring to the same embodiment or example. Furthermore, the particular features, structures or characteristics may be combined in any suitable combinations and/or sub-combinations in one or more embodiments or examples.

In the context of the present application, the term "cloud" broadly refers to a collection of machine instances, storage and/or network devices that work together in concert. The term "cloud computing" refers to a paradigm in which machine, storage, and application resources exist on a "cloud" of servers. In cloud computing shared resources, software and information are provided on-demand, like a public utility, via the Internet. Thus, cloud computing provides computation, data access, and storage resources without requiring users to know the location and other physical details of the computing infrastructure. Cloud computing is closely related to grid computing, which refers to the concept of interconnecting networked computers such that processing power, memory and data storage are all community resources that authorized users can utilize for specific tasks.

The term "server" broadly refers to any combination of hardware or software embodied in a computer (i.e., a machine instance) designed to provide services to client devices or processes. A server therefore can refer to a computer that runs a server operating system from computer-executable code stored in an associated memory, and which is provided to the user as a virtualized or non-virtualized machine; it can also refer to any software or dedicated hardware capable of providing computing services. In the context of the present disclosure, "Result" servers (also referred to as "collector" servers) are servers deployed and utilized to receive real-user measurement data sent from a user's client device. Each of the collectors process and aggregate the data items received.

The term "real-time" refers to a level of computer responsiveness that a user senses as sufficiently immediate or that enables the computer to keep up with some external process (for example, to present visualizations of load test results as it constantly changes). Thus, real-time is a mode of computer operation in which the computer collects data, analyzes or computes with the data, reports (e.g., visually displays) and/or stores the results nearly instantaneously, i.e., within seconds or milliseconds.

In the context of the present disclosure, the term "beacon" refers to data related to a user's experience on a particular website or web application, collected by a library (e.g., a JavaScript library) running on the browser of a client device, and sent via Hypertext Transfer (or Transport) Protocol (HTTP) to a server. The server receiving the beacon information may aggregate that data along with similar data received from other users accessing the same website or web application. Any HTTP headers sent by the browser as part of the HTTP protocol are also considered part of the beacon. In a sense, a beacon may be thought of as a page view on a website, but without a corresponding page. For every user who visits that website, the browser running the library on the user's client device measuresvarious metrics and records data that is then "beaconed" back to a results server in real-time as the user navigates through or uses the website.

A "data bucket" or "bucket" refers to a type of data buffer, data container, block of memory, or file on a disk that contains data. In the present disclosure, data buckets are arranged in a set or array, with each data bucket containing a count of a number of data values falling within a predetermined range. A given data bucket may be empty, or non-empty. The set or array of data buckets are typically arranged in an ascending order such that all of the data buckets span a full range of data values expected to be received for a particular data set or data type, e.g., from the lowest data value to the highest data value. Each of the data buckets are defined with predetermined value ranges such that a received data value will fall within a single one of the data buckets in the set or array.

In one embodiment, a system and method for fast percentile approximation using data bucketing is described. A results server (i.e., collector) aggregates beacon data received from a plurality of client devices associated with users visiting or accessing a particular website or web application. In one embodiment, the width or range of each data bucket used for collecting data received and aggregated from the user beacons is set to be equal, bucket-to-bucket. In another embodiment, each of the data buckets is assigned a predetermined variable-width or range. Meaningful histograms suitable for display in a real-time analytic dashboard may be generated by appropriate scaling of the variable-width data buckets in accordance with a scaling algorithm.

FIG. 1 is an example architectural diagram illustrating a computing platform that captures performance metrics from real user measurements in accordance with one embodiment of the present invention. In the embodiment shown, a user's client device (e.g., laptop computer) 13 is shown accessing a website hosted on a server 12 in network cloud 11 via messaging/communication link 14a. In response to visiting the website, host server 12 downloads the library to computing device 13 via link 14b. The library is then embedded in the browser running on device 13. Thereafter, the library collects various metrics and data generated from the user's experience on the particular website, and periodically sends that information, as shown by arrow 15, to a results server or collector server 20 located in network cloud 16.

The information collected and periodically sent to collector server 20 may include such metrics as web page load time, total load time, number of web pages accessed, average load time per page, etc. The specific metrics and data collected and sent to collector server 20 may vary depending on the information of interest to the business or enterprise owning the website. In addition, the periodicity or interval for sending the data collected may vary case-to-case. In one embodiment, metrics such as page load times and average load time may be sent for each page accessed by the user. In other embodiments, metrics and data collected may be beaconed to collector server 20 on a predetermined time interval, e.g., every 100 ms.

In one embodiment clouds 11 and 16 may comprise the same public network (i.e., the Internet). Alternatively, clouds 11 and 16 may comprise a variety of different public and/or private networks.

It is appreciated that collector server 20 may receive beacons containing metrics and other performance data from a multitude of different client devices, each of which may be located in a different geographic area. In other cases, collector server 20 may receive metrics and data from a multitude of different client devices located in the same geographic region (e.g., San Francisco or Boston). It is appreciated that a hierarchy of servers may be arranged to collect and consolidate data and metrics received from millions, or even billions, of client devices accessing the same website or web application at the same time. All of this data is sent to a Result Service reader/writer (R/W) unit 17 that aggregates the total data received and stores it in a database 18, making it accessible to a main computer instance 19, which implements a real-time analytic dashboard for visual presentation of the RUM results stored in database 18. It is appreciated that in other embodiments the aggregating unit may comprise another server, or other computing device.

In the example shown, main instance 19 is a virtual machine deployed on a server provided that communicates with a browser application. In one embodiment, main instance 19 may include a results server or service which reads data from database 18 and serves it to a web application, which in turn formats the data and serves it to an analytic dashboard in the browser. In operation, main instance 19 executes the coded sequence of computer executed steps (e.g., from code stored in a memory) that collects and aggregates all of the user beacon data and metrics for a particular website or web application. The computer program executed in the main instance 19 may also allocate the collector server resources required for the RUM across one or more different cloud providers. The same application that allocates/verifies collector server resources may also verify that the allocated servers are operational to collect and aggregate the RUM metrics and data. The main instance may also execute code that implements the RUM results aggregation steps and storage of results data in database 18. In addition, main instance 19 may implement the analytic dashboard utilized for visualized display of the aggregated results.

Although FIG. 1 shows only one computing device (e.g., a laptop) it is understood that a plurality of various types of different computing devices may be utilized by users. These various devices may include mobile computing devices such as smartphones, tablet computers, personal digital assistants, wristband computers, desktops, etc. Similarly, it is appreciated that the various user client devices accessing a particular website during a RUM may be geographically distributed anywhere around the globe, accessing the website server through one or more different networks.

Persons of skill in the art will understand that the software which implements the RUM results analysis platform may also be downloaded to the user's laptop computer 13 or implemented on a separate hardware appliance unit located either at the user's premises or anywhere in clouds 11, 16, or another cloud.

Figure 2:
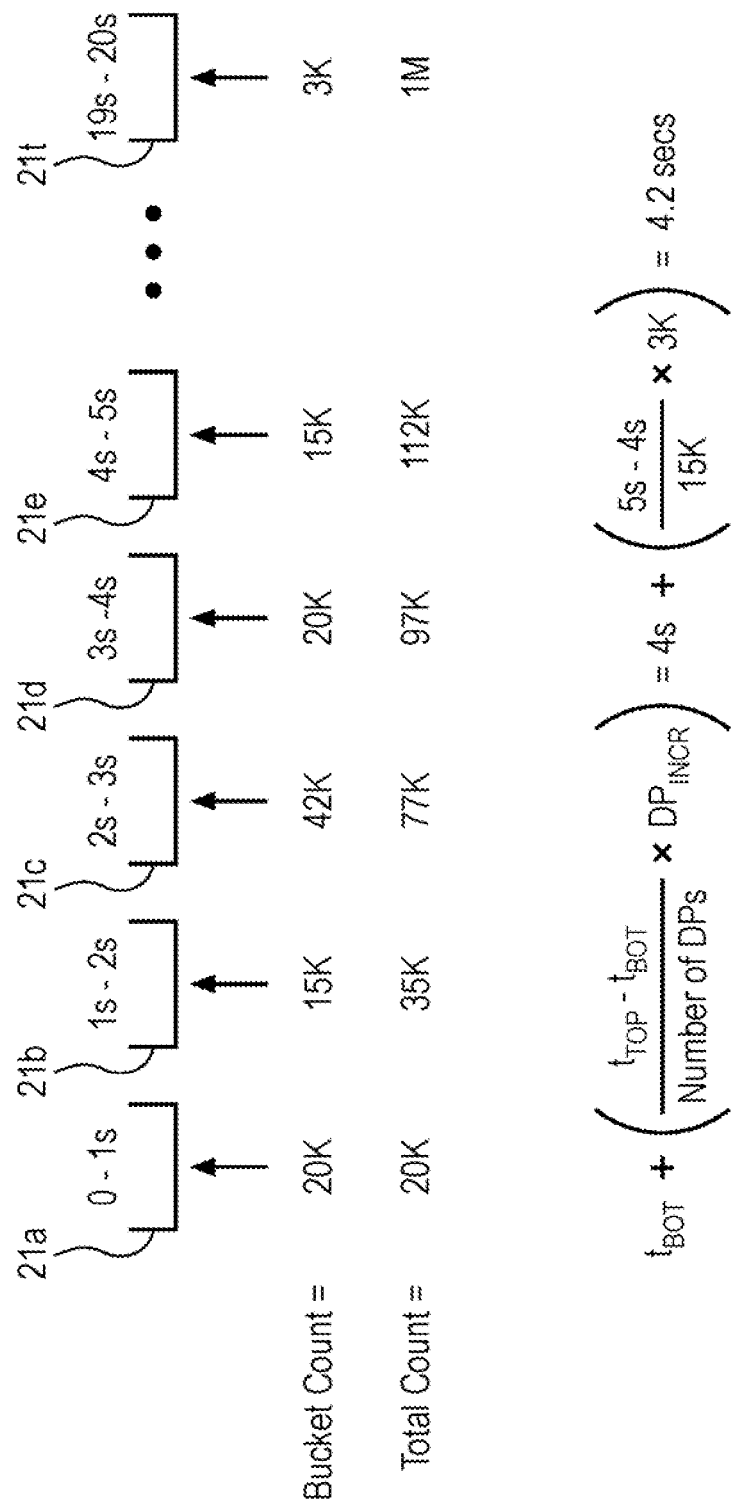
FIG. 2 is a diagram illustrating an example data bucketing technique for fast percentile approximation.

FIG. 2 is a diagram illustrating an example data bucketing technique for fast percentile approximation. Each of the data buckets 21a-21t represents a separate, distinct memory resource allocated to a particular data value range. For instance, each data bucket 21 may comprise a distinct physical memory address of a RAM, EPROM, EEPROM, or disk memory storage location (e.g., optical or magnetic). In one embodiment, each data bucket 21 comprises an accumulator, register, or counter that may be incremented for each data value falling within its determined range. In accordance with one embodiment, each collector server 20 (see FIG. 1) has an identical number of data buckets, each with a predefined data value range.

In the example of FIG. 2, assume that one million data points (beacons) have been received/collected at a single result server, each representing a web page load time experienced by a real user presently viewing a website. As shown, each data bucket is assigned a particular range of data values. For instance, bucket 21a is designated for load times in the range between 0-1 s; bucket 21b is for load times greater than 1 s, up and equal to 2 s; bucket 21c is for data points greater than 2 s, up to and including load times of 3 s, and so on. In another embodiment, the range may include the lower bound and extend up to, but not include, the upper bound. In the example of FIG. 2, each of the data buckets represents a counter that increments by one for each data point received that falls within its range. Thus, it is shown that 20K beacons were received from users experiencing load times in the range 0-1 s, 15K in the range 1-2 s, and so on, up to 1 million.

A percentile approximation for a given data set is computed by applying the formula shown at the bottom of FIG. 2 for a given percentile. In this example, a 10% percentile is calculated, which represents the 100K data point (DP) out of 1 million total data points. As shown, the 100K data point falls within data bucket 21e. According to the formula, the percentile approximation is calculated by adding the time of the bottom or lower end of the range of bucket 21e ($t_{BOT}$=4 s) to the product of the bucket range ($t_{TOP}$−$t_{BOT}$) and the data point increment ($DP_{INCR}$), divided by the total number of data points within that bucket. In the example shown, bucket 21e spans a range of 1 second (=5 s−4 s), the number of data points in bucket 21e is 15K and the data point increment from the bottom of bucket 21e to approximate the 10% percentile is 3K (=100K−97K). Thus, in this particular example, the 10% percentile load time is approximated at 4.2 seconds.

Persons of skill in the art will appreciate that the use of data bucketing for quickly computing percentile approximation for a large data set, as described above, can take place in real-time across thousands of computing devices, each in a different location, as the real user measurements are being collected and aggregated by the results servers in the cloud. It is further appreciated that finer granularity in data analysis calculations may be achieved by increasing the number of data buckets fixed in the array. Moreover, since the number of data buckets is finite and data counts from corresponding buckets are easily and quickly accumulated, the size of the data set is not a constraint. Thus, data analysis calculations such as percentile approximation, median load time, etc., can be performed in real-time.

Figure 3:
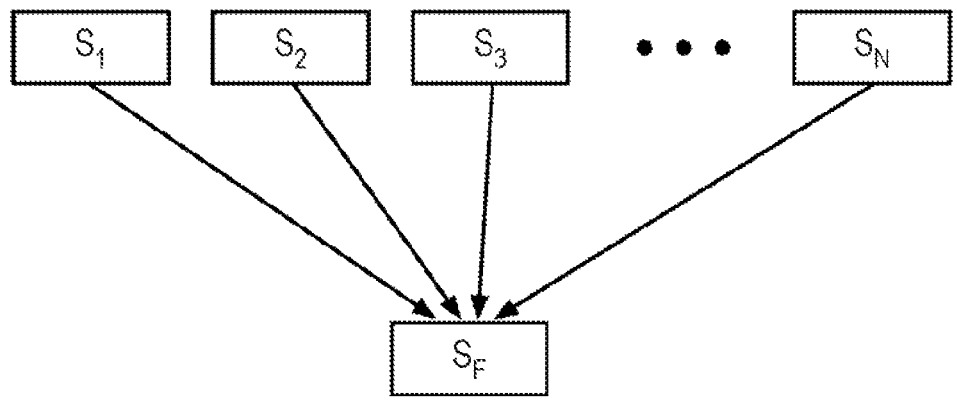
FIG. 3 is an example diagram showing a plurality of servers in a hierarchical arrangement.

FIG. 3 is an example diagram showing a plurality of servers arranged in a hierarchy which may be utilized to aggregate real user measurement data and computed statistics such as percentiles, medians, averages, etc., for very large data sets. As shown, each of servers $S_1$-$S_N$ is a collector server, such as that described in FIG. 1. Each collector server incorporates or is associated with an identically configured set of data buckets. Each collector server is connected through a network to receive beacons from a plurality of user browsers. For example, each collector server may include 125 data buckets that receive beacons from tens of thousands of real users. Instead of sending the beacons down the hierarchy, each collector server periodically sends the aggregated contents/counts of the set of data buckets down the hierarchy, e.g., to another server, $S_F$, which also has an identical set of data buckets. In this example, server $S_F$ aggregates the data counts for each data bucket count received from each of the servers shown at the top of FIG. 3. In other words, all of the data point counts of the first data bucket in each of collector servers $S_1$-$S_N$ are added together in the first data bucket of server $S_F$; all of the data point counts of the second data bucket in each of collector servers $S_1$-$S_N$ are added together in the second data bucket of server $S_F$, and so on.

It is appreciated that the hierarchal arrangement of servers shown in FIG. 3 may be repeated for an arbitrary number of levels. That is, although FIG. 3 shows a two-level hierarchy, other embodiments may have three, four, five, or more hierarchy levels.

Figure 4:
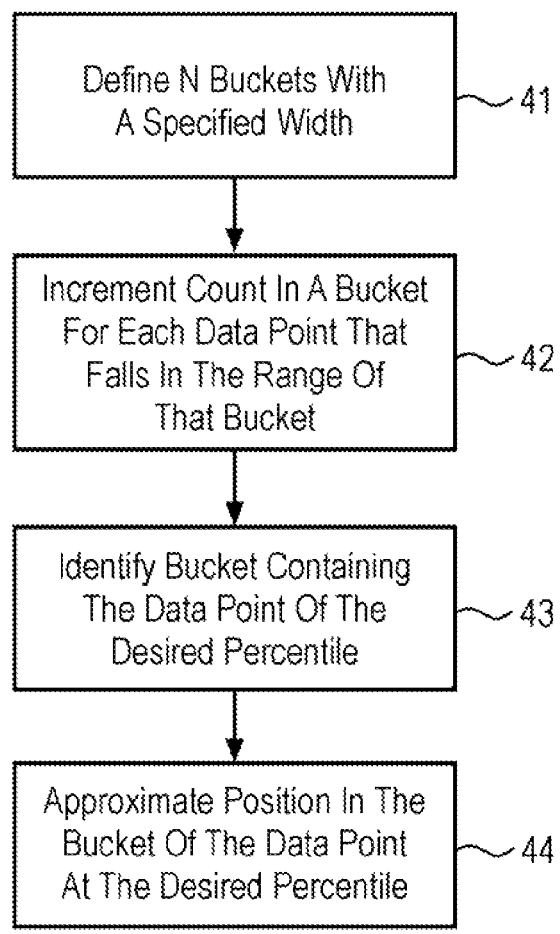
FIG. 4 illustrates an example flow diagram for fast percentile approximation using data bucketing.

FIG. 4 illustrates an example flow diagram for fast percentile approximation using data bucketing in accordance with one embodiment of the present invention. The process begins with the definition of a predetermined number of buckets, N (an integer greater than 1), each having a specified width or range of values. (Block 41) For example, a memory may be divided into regions to accommodate twenty data buckets, each containing a count of data values falling within a distinct range (width), with the data values representing a performance metric, e.g., web page load times received from real user measurements. The count for a given data bucket is incremented for each data point received having a value that falls within the range of that particular bucket. (Block 42)

For percentile calculations, the bucket containing the desired percentile is identified. (Block 43) By way of example, for a 50th percentile calculation this may be accomplished by dividing the total number of data points received at any given time by two, and then adding the counts together in ascending order (i.e., from the lowest or first data bucket on up) until the data bucket is identified as containing the 50th percentile data point. Finally, the position in the identified bucket of the data point at the desired percentile is approximated. (Block 44) In one embodiment, the approximation assumes a linear distribution of data points within the range defined for the bucket identified as containing the desired percentile data point. By way of illustration, if we assume that a fifth data bucket has 10,000 data points, a range of 1 second, and is identified as containing the 50th percentile data point for an array of data buckets containing a total of 1 million data points. And if we assume that the total sum of the first four data buckets is 495,000, then the 50th percentile data point may be approximated as being located midway (i.e., ½ second from the bottom value) in the fifth data bucket.

In another embodiment, the width or range of each data bucket in a set or array of buckets is not uniform. That is, the range of each data bucket may vary across the set. For instance, it may be desirable for certain data sets to have finer granularity (smaller range) at the lower end of the data type being measured and lower granularity (larger range) at the upper end. Consider the example of web page load times measured from real users. Such measurements may typically have data points mostly clustered around the lower end (e.g., 0-4 s) and fewer data points at the higher end (e.g., 10-20 s). Therefore, the data bucket widths may be defined to be very small at the lower end (e.g., 100 ms) and much larger at the higher end (e.g., 2-5 s). In other words, the width of the data buckets in a set or array may be tailored to the specific properties of the type of data being measured. In the case of web page load times, enterprises are understandably concerned about fast load times; therefore, they may define the buckets at the lower end to have finer granularity. It should be kept in mind, however, that the total number of buckets still remains fixed even though individual buckets may have different widths or ranges.

Figure 5:
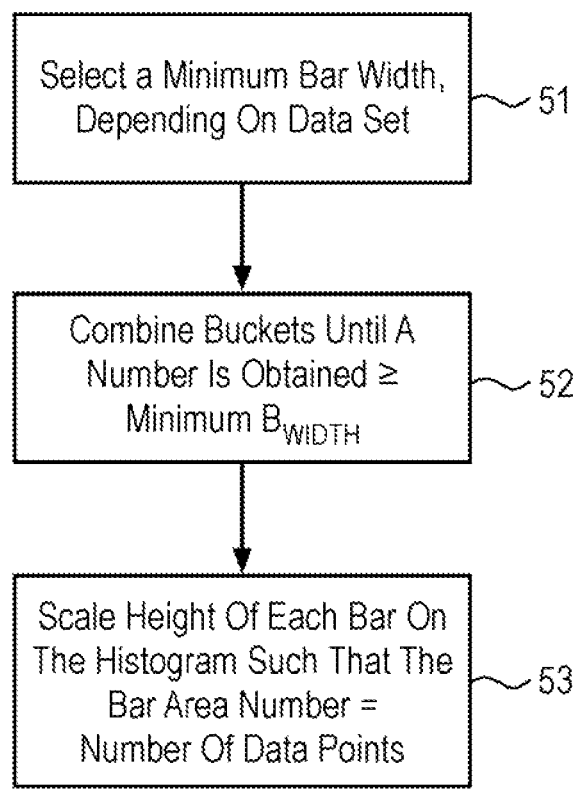
FIG. 5 illustrates an example flow diagram for histogram scaling using combined data bucketing.
Figure 6:
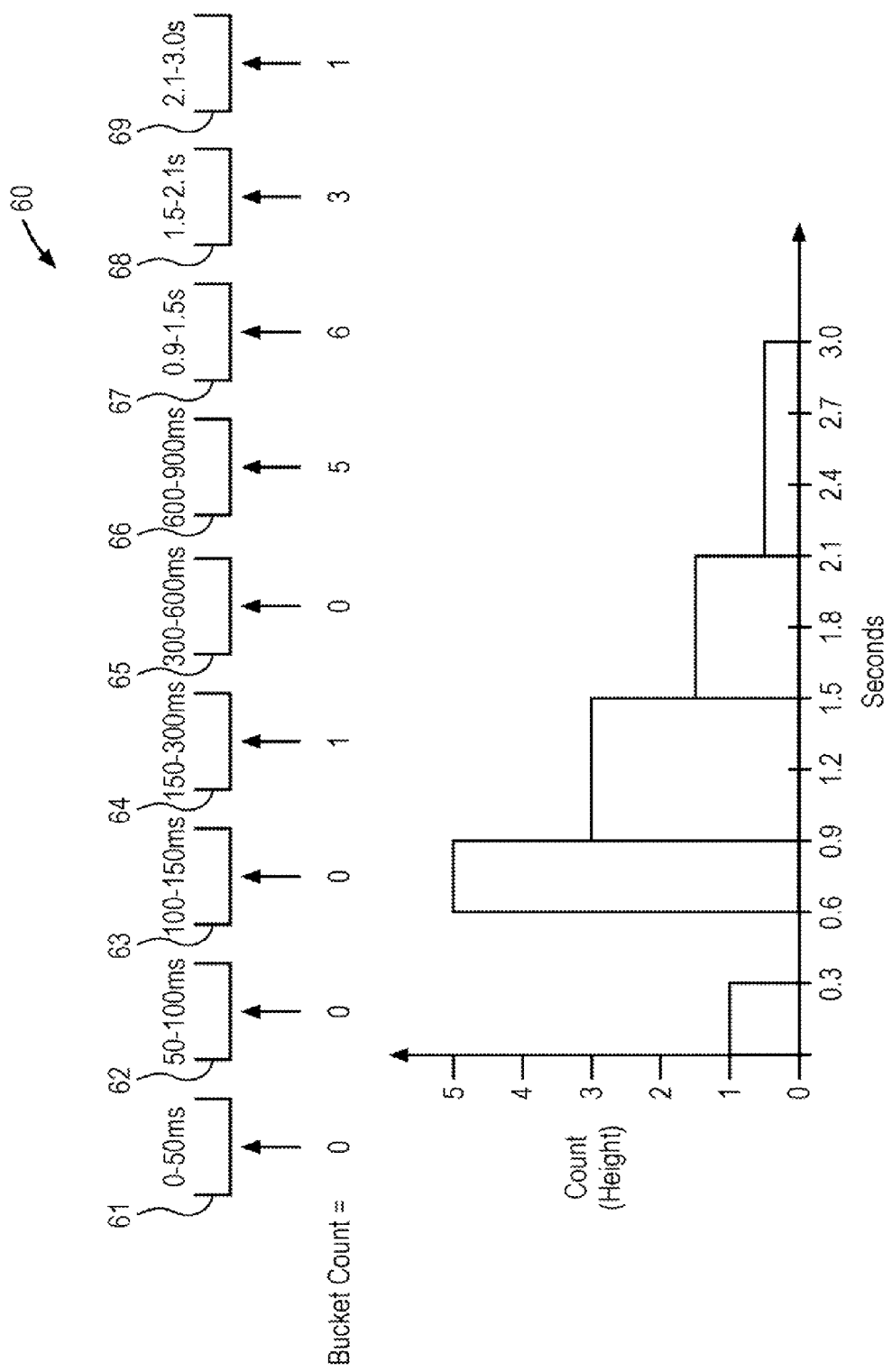
FIG. 6 is an example histogram with variable-width data buckets, with the histogram bars scaled in height.

FIG. 5 illustrates an example flow diagram for histogram scaling using combined data bucketing, where the width or range of individual buckets may vary bucket-to-bucket. The process for creating scaled histograms may be understood in conjunction with FIG. 6. FIG. 6 is an example histogram with variable-width data buckets, with the histogram bars scaled in height to provide a more proportional, and thus meaningful, data display. In FIG. 6, an array of nine data buckets (61-69) is shown with variable-width data buckets. As shown, bucket 61 has a width of 50 ms, bucket 62 has a width of 50 ms, bucket 63 has a width of 150 ms, and so on. The data point count, which indicates the number of data points falling within each bucket, is respectively shown for buckets 61-69 as 0, 0, 0, 1, 0, 5, 6, 3, 1.

The initial step (block 51) in the example process shown in FIG. 5 is to determine a minimum histogram bar width ($B_{WIDTH}$) for purposes of display on the histogram chart or graph. As discussed previously, the minimum bar width depends on considerations of the type of data comprising the data set. In the example of FIG. 6, for instance, the minimum bar width is selected to be 300 ms which relates to the full web page load time being measured. The next step in the process involves combining data from buckets neighboring buckets, beginning on the bottom and ascending in order, until the minimum bar width is reached or exceeded. For example, buckets 61, 62, and 63 each are 50 ms wide, whereas bucket 64 is 150 ms wide. Combining buckets 61-64 results in a total width (50+50+50+150=300 ms) that is equal to or greater than the minimum histogram bar width. Thus, the first bar on the left-most side of the histogram is displayed as a bar 0.3 s wide and having a height of "1". The height of this first bar is equal to the total data count of the combined buckets 61-64.

Continuing with this example, the next data bucket 65 is 300 ms wide but contains no data points. Therefore, the next 300 ms interval on the histogram of FIG. 6 shows no data (height=0). Data bucket 66 is also 300 ms wide and contains five data points. Consequently, the next bar on the histogram is displayed as having a width of 300 ms and a height of "5".

Buckets 67, 68 and 69 all have widths that are greater than the minimum bar width. As shown, the histogram bars representing buckets 67-69 have widths that are equal to the width of their corresponding bucket. Thus, the last three (right-most) bars illustrated in FIG. 6 have widths ranging from 0.9-1.5 s, 1.5-2.1 s, and 2.1-3.0 s, respectively. The height of each of these wider bars is shown scaled in accordance with the last step in the process flow of FIG. 5. In block 53 the height of each histogram bar is scaled such that the total area (=height multiplied by width) of the bar displayed on the chart or graph is equal to the number of data points within that bucket or area. This means that histogram bars created wider than the minimum width have the height of the bar scaled downward. Thus, for the bar shown in FIG. 6 between 0.9-1.5 s, the six data points of bucket 67 are represented in the histogram as having a scaled height of "3" (=6 DPs divided by 2, where "2" is twice the min. bar width). Similarly, the bar illustrated between 1.5 to 2.1 s is scaled to a height of "1.5" (=3 DPs/2); and, finally, the last bar shown between 2.1-3.0 s is rendered and displayed with a scaled height of 0.333 (=1 DP/3).

It should be understood that elements of the disclosed subject matter may also be provided as a computer program product which may include a machine-readable medium having stored thereon instructions which may be used to program a computer (e.g., a processor or other electronic device) to perform a sequence of operations. Alternatively, the operations may be performed by a combination of hardware, firmware, and software. The machine-readable medium may include, but is not limited to, floppy diskettes, optical disks, CD-ROMs, and magneto-optical disks. ROMs, RAMs, EPROMs, EEPROMs, magnet or optical cards, or other type of machine-readable medium suitable for storing electronic instructions.

Additionally, although the present invention has been described in conjunction with specific embodiments, numerous modifications and alterations are well within the scope of the present invention. Accordingly, the specification and drawings are to be regarded in an illustrative rather than a restrictive sense.

We claim:

1. A computer-implemented method for real-time capture and analysis of data of real user experiences either accessing a website, or using a web-based application or a mobile app, via a plurality of client devices, each of the client devices being associated with a user, the computer-implemented method comprising:

receiving, in each of a plurality of collector servers, web page load time data values transmitted from the plurality of client devices, each web page load time data value representing a real user measurement (RUM) associated with an experience of the user on a web page of the website, or using the web-based application or the mobile app, the web page load time data value being transmitted while the user is on the web page, or using the web-based application or the mobile app, each of the collector servers being located in a network cloud remote to each of the client devices;

for each web page load time data value received, incrementing a count in a corresponding one of a set of N, where N is an integer greater than 1, data buckets, each data bucket being defined in a memory resource for web page load time data values falling within a predetermined range of values, the set of N data buckets being arranged in an order of web page load time data value ranges;

periodically transmitting, by each collector server, the count of each of the N data buckets to a unit over a network;

aggregating, by the unit in a final set of N data buckets, all of the counts received from each collector server for each corresponding data bucket such that an ith ,data bucket, where i is an integer ranging from 1 to N, of the final set contains a sum of all of the ith data bucket counts received from all the collector servers; and rendering, on an analytic dashboard, a visual presentation in the form of a histogram of the aggregated counts of the web page load time data values, wherein a height of each bar of the histogram corresponds to an aggregated count of one or more of the N data buckets of the final set, the rendering being performed while the client devices are either accessing the website, or using the web-based application or the mobile app, wherein the rendering of the visual representation is performed in real-time concurrently with the on-going collection of the web page load time data values, within seconds or milliseconds from a time that the web page load time data values are fiat received in the plurality of collector servers, such that the histogram changes nearly instantaneously in response to new web page load time data values being received in the plurality of collector servers.

2. The computer-implemented method of claim 1 further comprising the steps of:

determining a total count equal to the sum of the counts of all N data buckets in the final set;

calculating a percentile count as the product of the total count and a percentage M;

identifying on the analytic dashboard a particular data bucket of the final set as having a Mth percentile data value based on the percentile count;

approximating the Mth percentile data value as:

$$V_B+((R/NUM)\times I)$$

where $V_B$ is a value at a bottom of the predetermined range of the particular data bucket, R is the predetermined range of the particular data bucket, NUM is the count of the particular data bucket and I is an incremental count within the particular data bucket that corresponds to the percentile count.

3. The computer-implemented method of claim 1 wherein the set of N data buckets and the final set of N data buckets are identically configured.

4. The computer-implemented method of claim 1 wherein the predetermined range is identical for all of the N data buckets.

5. The computer-implemented method of claim 1 wherein at least one of the, data buckets has a different predetermined range than that of another data bucket.

6. The computer-implemented method of claim 1 further comprising:

selecting a minimum bar width for the histogram; and in the event that a given bar of the histogram has a width that is an integer multiple of the minimum bar width, scaling a height of the given bar to a reduced height equal to the aggregated count represented by the given bar divided by the integer multiple.

7. The computer-implemented method of claim 1 further comprising storing the final set of N data buckets in a database.

8. The computer-implemented method of claim 7 wherein the database is accessible to a computer running a program that generates the analytic dashboard.

9. The computer-implemented method of claim 1 wherein the order is an ascending order.

10. A non-transitory computer-readable storage medium encoded with computer instructions, which, when executed by one or more processors operable to:

receive, in each of a plurality of collect servers, web page load time data values transmitted from a plurality of client devices, each web page load time data value representing a real user measurement (RUM) associated with an experience of a user either browsing a website, or using a web-based application or a mobile app, the user beacon data value being transmitted in real-time while the user is on a web page, or using the web-based application or the mobile app, each of the collector servers being located in a network cloud remote to each of the client devices;

increment, for each web page load time data value received, a count in corresponding one of a set of N, where N is an integer greater than 1, data buckets, each data bucket being defined in a memory resource for web page load, time data values falling within a predetermined range of values, the set of N data buckets being arranged in an order of web page load time data value ranges;

transmit, by each collector server, the count of each of the N data buckets to a unit over a network;

aggregate, by the unit in a final set of N data buckets, all of the counts received from each collector server for each corresponding data bucket such that an ith data bucket, where i is an integer ranging from 1 to N. of the final set contains a sum of all of the ith data buckets counts received from all of the collector servers; and render, on an analytic dashboard, a visual presentation in the form of a histogram of the aggregated counts of the web page load time data values, wherein a height of each bar of the histogram corresponds to an aggregated count of one or more of the N data buckets of the final set, the rendering being performed in real-time while the client devices are either accessing the website, or using the web- based application or the mobile app, wherein the visual representation is rendered in real-time concurrently with the on-going collection of the web page load time data values, within seconds or milliseconds from a time that the web page load time data values are first received in the plurality of collector servers, such that the histogram changes nearly instantaneously in response to new web page load time data values being received in the plurality of collector servers.

11. The non-transitory computer-readable storage medium of claim 10 wherein execution of the computer instructions is further operable to:

determine a total count equal to the sum of the counts of all N data buckets in the final set;

calculate a percentile count as the product of the total count and a percentage M;

visually identify on the analytic dashboard a particular data bucket of the final set as having a Mth percentile data value based on the percentile count;

approximate the Mth percentile data value as:

$$V_B + ((R/NUM) \times I)$$

where $V_B$ is a value at a bottom of the predetermined range of the particular data bucket, R is the predetermined range of the particular data bucket, NUM is the count of the particular data bucket and I is an incremental count within the particular data bucket that corresponds to the percentile count.

12. The non-transitory computer-readable storage medium of claim 10 wherein the set of N data buckets and the final set of N data buckets are identically configured.

13. The non-transitory computer-readable storage medium of claim 10 wherein the predetermined range is identical for all of the N data buckets.

14. The non-transitory computer-readable storage medium of claim 10 wherein at least one of the data buckets has a different predetermined range than that of another data bucket.

15. The non-transitory computer-readable storage medium of claim 10 wherein execution of the computer instructions is further operable to store the final set of N data buckets in a database accessible to a computer running a program that generates the analytic dashboard.

\* \* \* \* \*